(12) United States Patent
Shotey et al.

(10) Patent No.: US 7,479,598 B1
(45) Date of Patent: Jan. 20, 2009

(54) ELECTRICAL DEVICE COVER

(75) Inventors: Marcus J. Shotey, Scottsdale, AZ (US); Jeffrey P. Baldwin, Phoenix, AZ (US); Richard L. Cleghorn, Tempe, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 11/764,314

(22) Filed: Jun. 18, 2007

Related U.S. Application Data

(60) Provisional application No. 60/804,994, filed on Jun. 16, 2006.

(51) Int. Cl.
*H01H 9/02* (2006.01)

(52) U.S. Cl. .................... 174/58; 174/50; 174/135; 174/66; 220/4.02; 33/528

(58) Field of Classification Search ............... 174/50, 174/53, 57, 58, 66, 67, 135; 220/3.3, 3.5, 220/4.02, 3.94, 241, 242; 439/535; 248/906; 33/528

See application file for complete search history.

(56) References Cited

U.S. PATENT DOCUMENTS

| | | | |
|---|---|---|---|
| 5,763,831 A | 6/1998 | Shotey et al. | |
| 6,166,329 A * | 12/2000 | Oliver et al. | 174/58 |
| 6,395,984 B1 | 5/2002 | Gilleran | |
| 6,642,453 B2 | 11/2003 | Shotey et al. | |
| 6,894,223 B1 | 5/2005 | Shotey et al. | |
| 6,956,169 B1 * | 10/2005 | Shotey et al. | 174/58 |
| 7,034,222 B1 * | 4/2006 | York | 174/50 |
| 7,109,414 B2 * | 9/2006 | Reynolds | 174/50 |
| 7,176,377 B1 | 2/2007 | Gretz | |
| 7,301,099 B1 * | 11/2007 | Korcz | 174/58 |
| 7,321,096 B1 * | 1/2008 | Huang | 174/58 |
| 7,388,162 B1 * | 6/2008 | Gretz | 174/480 |

\* cited by examiner

*Primary Examiner*—Dhiru R Patel
(74) *Attorney, Agent, or Firm*—Booth Udall, PLC

(57) ABSTRACT

An electrical device cover assembly with a base unit having an electrical box, where the electrical box has an electrical device opening on a front side of the electrical box. Particular implementations may include a cover plate slidably coupled into the electrical device opening of the electrical box over the electrical device. A sleeve may be slidably coupled into the electrical device opening and be slidable with respect to the cover plate. The sleeve may also have a sleeve mounting feature and at least one sleeve hinge member. A lid having at least one hinge member may be included with the lid coupled to the at least one sleeve hinge member by the at least one hinge member.

25 Claims, 6 Drawing Sheets

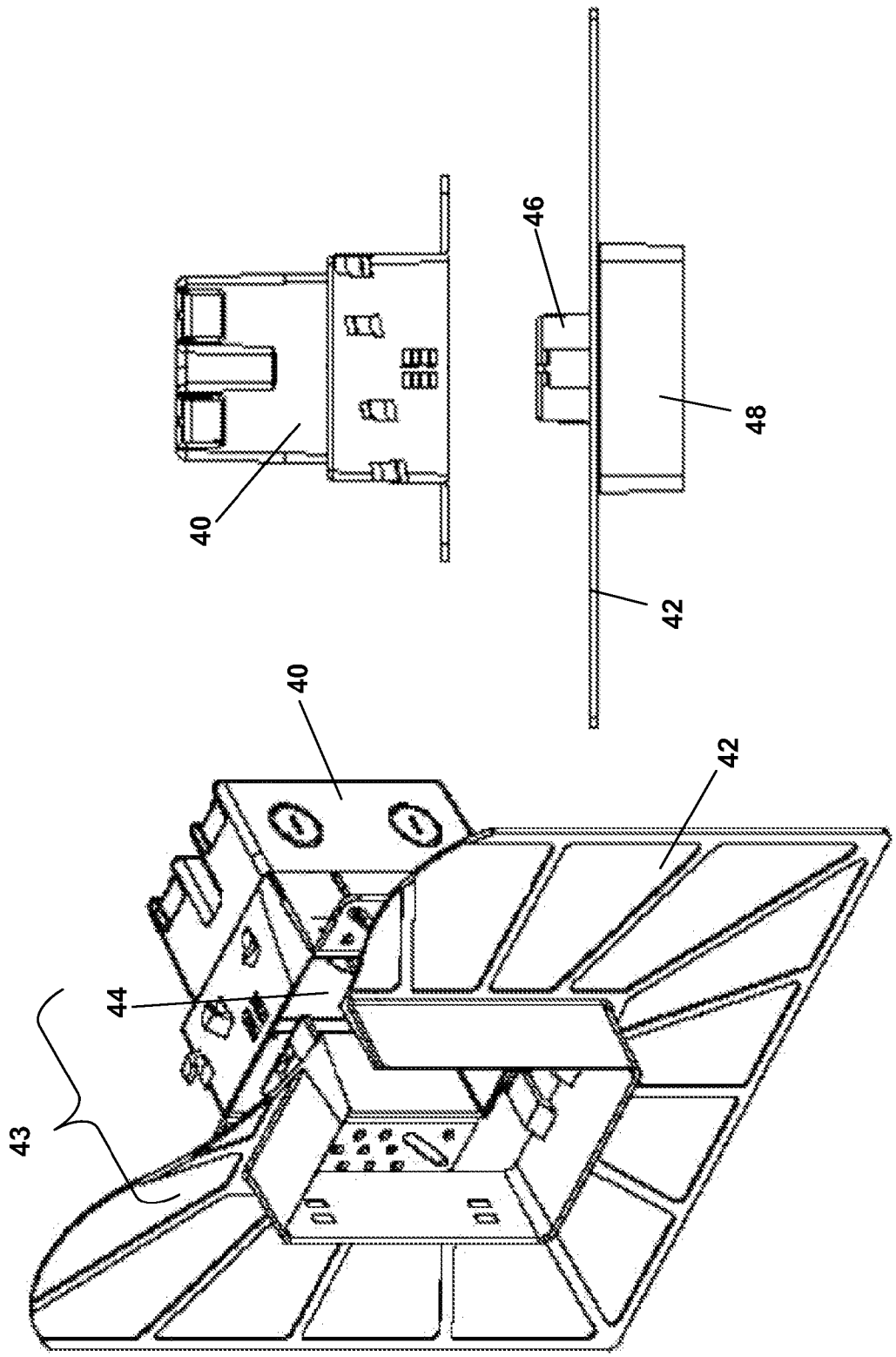

ELECTRICAL DEVICE COVER

CROSS REFERENCE TO RELATED APPLICATIONS

This document claims the benefit of the filing date of U.S. Provisional Patent Application 60/804,994, entitled "Adjustable In-Use Recessed Outlet Cover" to Shotey, et al. which was filed on Jun. 16, 2006, the disclosure of which is hereby incorporated entirely herein by reference.

The disclosure of U.S. Utility patent application to Shotey, et al. entitled "Weatherproof Siding Flange," application Ser. No. 11/684,070, filed Mar. 9, 2007 is hereby incorporated in the present application in entirety.

BACKGROUND

1. Technical Field

Aspects of this document relate generally to covers for electrical devices.

2. Background Art

Conventionally, covers have been used protect electrical devices from rain and other contaminants. U.S. Pat. No. 4,988,832 entitled "Recessed Electrical Outlet With Cover" to Shotey, issued Jan. 29, 1991 describes an example of such a cover, and its disclosure is hereby incorporated herein by reference. Many covers are conventionally installed within an opening in a wall or other surface and contain cord ports that allow electrical connectors to remain connected while a lid is closed over the electrical device mounted within the cover.

SUMMARY

Implementations of an electrical device cover assembly may include a base unit having an electrical box, where the electrical box has an electrical device opening on a front side of the electrical box. A cover plate may be slidably coupled into the electrical device opening of the electrical box over the electrical device. A sleeve may be slidably coupled into the electrical device opening and be slidable with respect to the cover plate. The sleeve may also have a sleeve mounting feature and at least one sleeve hinge member. A lid having at least one hinge member may be included with the lid coupled to the at least one sleeve hinge member by the at least one hinge member.

Particular implementations of an electrical device cover assembly may include one, all, or any combination of the following:

The base unit may include a siding flange coupled at the electrical device opening of the electrical box where the siding flange extends substantially parallel to a plane formed by the electrical device opening of the electrical box.

The base unit may include a sleeve flange coupled at the electrical device opening of the electrical box and the electrical device opening of the base unit may have a perimeter. The sleeve flange may extend substantially perpendicular to a plane formed by the electrical device opening of the electrical box and along a majority of the perimeter of the electrical device opening.

The base unit may also include a face plate slidably coupled into the electrical device opening of the base unit.

Implementations of an electrical device cover may include a cover plate configured to mount within an electrical device opening of an electrical box. A sleeve may be included that is configured to slidably couple into the electrical device opening of the electrical box. The sleeve may be slidable with respect to the cover plate and may have a sleeve mounting feature and at least one sleeve hinge member. A lid having at least one lid hinge member may be included with the lid coupled to the sleeve hinge member through the at least one lid hinge member.

Implementations of an electrical device cover may include one, all, or any of the following:

A siding flange configured to couple at the electrical device opening of the electrical box may be included. The siding flange may be configured to extend substantially parallel to a plane formed by the electrical device opening of the electrical box.

A sleeve flange configured to couple at the electrical device opening of the electrical box may be included. The sleeve flange may be configured to extend substantially perpendicular to a plane formed by the electrical device opening of the electrical box and may be configured to extend along a majority of the perimeter of the electrical device opening. The sleeve flange may further include at least one removable section.

Implementations of an electrical device cover and an electrical device cover assembly may include one, all, or any number of the following:

The cover plate may include at least one sleeve mounting opening on a side of the cover plate. The cover plate may also include at least one mounting pin aperture. The cover plate may have an electrical device aperture therethrough and a box mounting screw aperture therethrough where the box mounting screw apertures are keyhole slot apertures.

The electrical device cover may also include at least a second cover plate.

The cover plate may be configured to accommodate a first electrical device type and the cover plate may further have at least one removable tab. Removal of the at least one removable tab may convert an electrical device aperture in the cover plate to accommodate at least a second electrical device type different from the first electrical device type.

The cover plate may be configured to accommodate a first electrical device type and may include at least one adapter plate, where the adapter plate converts an electrical device aperture in the cover plate to accommodate at least a second electrical device type different from the first electrical device type.

The adapter plate may include at least one removable tab, where removal of the at least one removable tab converts the electrical device aperture in the cover plate configured to accommodate a first electrical device type to accommodate at least a second electrical device type different from the first electrical device type.

A cord port may be included in at least one of a surface of the lid and the base unit and/or the sleeve.

A face plate slidably coupled into the electrical device opening of the base unit may be included.

The sleeve may include sleeve hinge member on adjacent sides of the sleeve and the lid may include lid hinge members on adjacent slides of the lid.

The sleeve flange may be formed integrally with the base unit.

Implementations of an electrical device cover and an electrical device cover assembly may include a method of installation including the steps of mounting an electrical box to a wall, coupling an electrical device into the electrical box, slidably coupling a cover plate into the electrical device opening of the electrical box over the electrical device, and sliding a sleeve having a sleeve mounting feature and at least one sleeve hinge member into the electrical box. The method may also include the steps of coupling the sleeve to the electrical box through the sleeve mounting feature and hingedly coupling a lid having at least one lid hinge member to the at least one sleeve hinge member through the at least one lid hinge member.

In particular implementations, the method may further include the step of coupling a sleeve flange at the electrical device opening of the electrical box. The sleeve flange may also include at least one removable section, and the method may further include the step of removing the at least one removable section of the sleeve flange.

In particular implementations, the step of coupling the cover plate into the electrical device opening of the electrical box over the electrical box may be prior to the step of sliding a sleeve having a sleeve mounting feature and at least one sleeve hinge member into the electrical box. In other implementations the step of sliding a sleeve having a sleeve mounting feature and at least one sleeve hinge member into the electrical box may be prior to the step of slidably coupling a cover plate into the electrical device opening of the electrical box over the electrical device.

The method may also include the step of coupling a mounting pin coupled with the electrical box at a mounting opening in the cover plate.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 2A is an exploded view of a particular implementation of an electrical box and siding flange with a portion of the upper part of the siding flange removed;

FIG. 2B is a top exploded view of the electrical box and siding flange illustrated in FIG. 2A;

DESCRIPTION

This disclosure, its aspects and implementations, are not limited to the specific components or assembly procedures disclosed herein. Many additional components and assembly procedures known in the art consistent with the intended electrical device cover assembly or electrical device cover and/or assembly procedures for an electrical device cover assembly or electrical device cover will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical device cover assemblies and electrical device covers and implementing components, consistent with the intended operation.

Structure.

Figure 1:
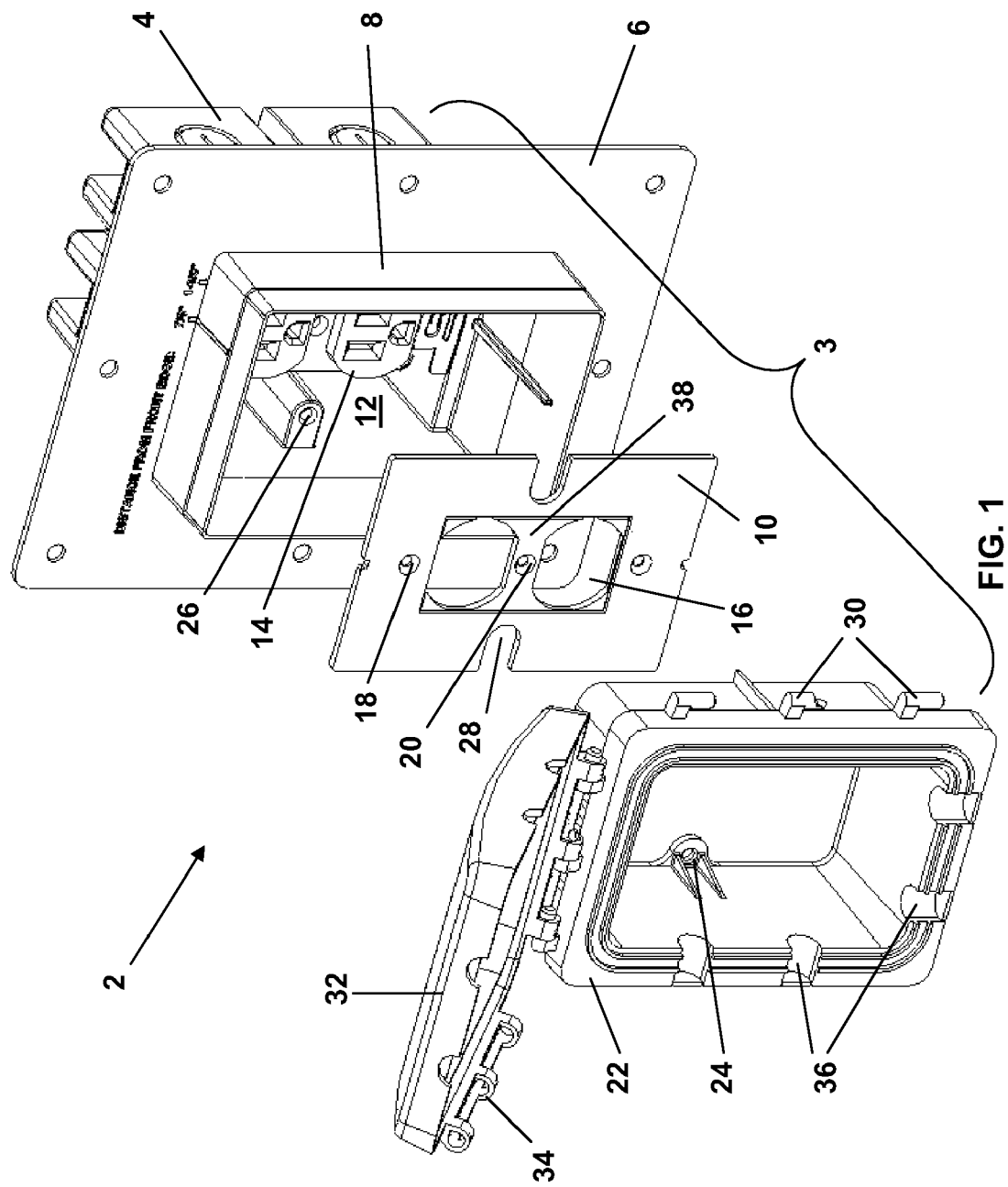
FIG. 1 is an exploded view of a particular implementation of an electrical device cover assembly.

Referring to FIG. 1, an implementation of an electrical device cover assembly 2 is illustrated. The electrical device cover assembly 2 may include a base unit 3 having an electrical box 4 with a siding flange 6 and a sleeve flange 8. A cover plate 10 may be coupled into an electrical device opening 12 in the electrical box 4 and may be configured to cover an electrical device 14 mounted within the electrical box 4 through an electrical device aperture 16. The cover plate 10 of the base unit 3 may also include at least one box mounting screw aperture 18 therethrough. The box mounting screw aperture 18 may be a keyhole slot aperture. The cover plate 10 may have a cover plate mounting screw aperture 20 therethrough as well to allow the cover plate 10 to be coupled to the electrical device 14.

The base unit 3 of the electrical device cover assembly 2 may also include a sleeve 22 that may be configured to slidably couple into the electrical device opening 12 in the electrical box 4. The sleeve 22 may slidably couple into the electrical device opening 12 either on an inside or outside edge of the sleeve flange 8. The sleeve 22 may also include a sleeve mounting feature 24. In the particular implementation of a sleeve 22 illustrated in FIG. 1, the sleeve mounting feature 24 is a screw opening into which a mounting screw can be inserted to couple the sleeve 22 to a corresponding box sleeve mounting feature 26 within the electrical device opening 12 of the electrical box 4. A plurality of sleeve mounting features 24 may be included in particular implementations of a sleeve 22. In particular implementations, a sleeve mounting feature 24 may include, by non-limiting example, a screw opening, a ratchet, a serration, a spring, prongs, and any other method of coupling two pieces together.

To allow the cover plate 10 to slidably couple into the electrical device opening 12 of the electrical box while the box sleeve mounting feature 26 is present, at least one sleeve mounting opening 28 may be included in implementations of a cover plate 10. Implementations of an electrical device cover assembly 2 may have the cover plate 10 slidable with respect to the sleeve 22; in the implementation illustrated in FIG. 1, the cover plate 10 and sleeve 22 are formed as separate pieces. In other particular implementations, while the cover plate 10 and sleeve 22 may be formed integrally and slidably coupled into the electrical device opening 12 of the electrical box 4 as a single piece, the cover plate 10 may still be slidable with respect to the sleeve 22 through features such as, by non-limiting example, a living hinge, a removable tab, a break-off section, a rubber boot, and any other method of flexibly and/or removably coupling pieces together. Because the cover plate 10 is slidable with respect to the sleeve 22, the cover plate 10 can be coupled over the electrical device 14 while the sleeve 22 can be adjustably slidably coupled into the electrical device opening 12 of the electrical box 4. Because the sleeve 22 is adjustable, the electrical device cover assembly 2 can be used in situations where the thickness of the wall or material surrounding the electrical box 4 varies in thickness. In these situations, because of the adjustability of the sleeve 22, the electrical device cover assembly 2 may be rendered more weatherproof as the sleeve 22 may be securely tightened against the outer surface of the wall material surrounding the electrical box 4 and the cover plate 10 can more firmly cover and/or support the electrical device 14 inside.

The sleeve 22 may include at least one sleeve hinge member 30. A lid 32 may be coupled to the sleeve 22 of the base unit 3 through the coupling together of the at least one sleeve hinge member 30 with the at least one lid hinge member 34. The sleeve hinge member 30 and the lid hinge member 34 may be located on adjacent sides or a corner of the sleeve 22 and lid 32, respectively, to enable the electrical device cover assembly 2 to be mounted in either a horizontal or vertical orientation. The electrical device cover assembly 2 may be mounted in a horizontal orientation when the longest axis of the electrical device 14 is substantially perpendicular to the structure within the wall or area to which the electrical box 4 is coupled. The electrical device cover assembly 2 may be mounted in a vertical orientation when the longest axis of the electrical device 14 is substantially parallel to the structure within the wall or area to which the electrical box 4 is coupled. In addition, a cord port 36 may be included in a surface of the base unit 3. In particular implementations, the cord port 36 may be formed in a surface of the sleeve 22, the lid 32, or both the sleeve 22 and the lid 32. The cord port 36 may be open, closed, or partially closed by a barrier that serves to block entry of water and other contaminants. The cord port 36 may also include a removable tab. As illustrated in FIG. 1, a plurality of cord ports 36 may also be included in particular implementations of an electrical device cover assembly 2.

As illustrated in FIG. 1, particular implementations of a cover plate 10 may be configured to accommodate at least a first electrical device type through the electrical device aperture 16. In the particular implementation illustrated in FIG. 1, the cover plate 10 has been configured to accommodate a duplex receptacle. Implementations of a cover plate 10 may include at least one removable tab 38, removal of which may convert the electrical device aperture 16 to accommodate at least a second electrical device type different from the first electrical device type. In the particular implementation of a cover plate 10 illustrated in FIG. 1, a plurality of removable tabs 38 have been included, the removal of which allows the electrical device aperture 16 to be converted from accommodating a duplex receptacle to a Decora-style receptacle or a Ground Fault Current Interrupter (GFCI) receptacle. In other particular implementations of a cover plate 10, the cover plate 10 may be blank and contain no electrical device aperture 16. Implementations of cover plates 10 that are blank may contain at least one removable tab 38, the removal of which allows the cover plate 10 to be converted to accommodate at least one electrical device type through removal of the at least one removable tab 38.

Particular implementations of a base unit 3 of an electrical device cover assembly 2 may include at least a second cover plate. Also, implementations of a cover plate 10 may include at least one adapter plate. The adapter plate may convert the electrical device aperture 16 in the cover plate 10 to accommodate at least a second electrical device type different from the first electrical device type. The adapter plate may also include at least one removable tab that allows the electrical device aperture 16 of the cover plate 10 to be converted from accommodating a first electrical device type to accommodating a second electrical device type different from the first electrical device type. Relevant teachings regarding removable tabs and adapter plates can be found in may be found in U.S. Pat. No. 6,960,721 to Shotey et al. entitled "Convertible Electrical Device Cover Having Removable Tabs With Offset Grooves," the disclosure of which is hereby incorporated herein by reference.

Referring to FIG. 2A, another particular implementation of an electrical cover assembly 40 is illustrated. The electrical cover assembly 40 may include a base unit 43 having an electrical box 41 and siding flange 42 that slidably couples into the electrical device opening 44. Referring to FIG. 2B, the sliding flange 42 may couple to the electrical box 41 through at least one clip 46. As illustrated, in particular implementations of an electrical cover assembly 40, the sleeve flange 48 may be formed integrally with the siding flange 42. In other particular implementations, the sleeve flange 48 may be formed integrally with the electrical box 41. Finally, some implementations of a base unit 43 may have both the sleeve flange 48 and the siding flange 42 formed integrally with the electrical box 41. Relevant teachings regarding the structure, formation, and use of siding flanges 42 may be found in U.S. Utility patent application to Shotey, et al. entitled "Weatherproof Siding Flange," application Ser. No. 11/684,070, filed Mar. 9, 2007, the disclosure of which was previously incorporated herein by reference.

Figure 3B:
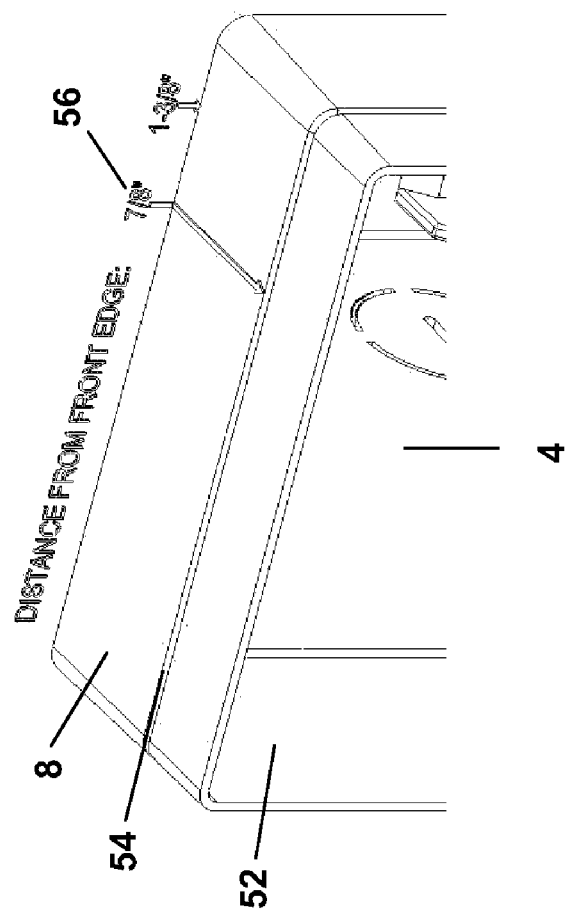
FIG. 3B is a detail view of the sleeve flange of the electrical box shown in FIG. 1.
Figure 3A:
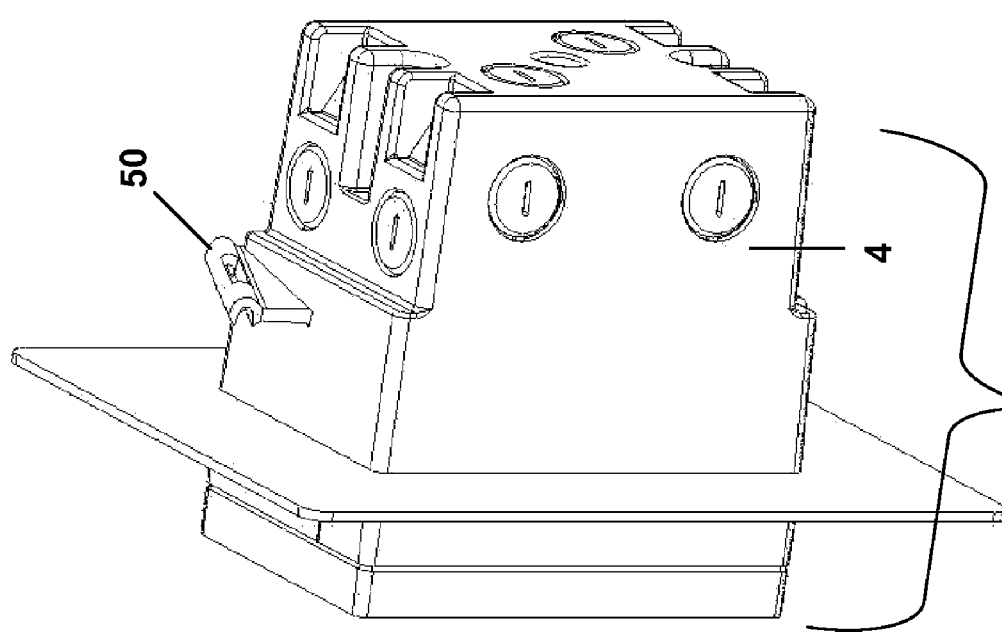
FIG. 3A is a side perspective view of the electrical box shown in FIG. 1.

Referring to FIG. 3A, an implementation of a base unit 3 including an electrical box 4 like the one illustrated in FIG. 1 is shown. The electrical box 4 may include a mounting feature 50 to allow the electrical box 4 to be coupled to a stud within a wall or to another surface. FIG. 3B is a detail view of the sleeve 8 of the base unit 3 of the electrical box 4 showing that in particular implementations, the sleeve 8 may contain at least one removable section 52. The removable section 52 may be removable through a groove 54 included in the sleeve 8. Relevant teachings regarding the formation and structure of a groove 54 may be found in U.S. Pat. No. 6,960,721 to Shotey et al. entitled "Convertible Electrical Device Cover Having Removable Tabs With Offset Grooves," the disclosure of which was previously incorporated herein by reference. As illustrated, particular implementations of a base unit including an electrical box 4 may include a depth indicator 56, allowing the installer to see the thickness of the wall material in which the electrical box 4 has been mounted. The depth indicator 56 may extend across the sleeve 8 until it reaches a groove 54 or other predetermined distance across the sleeve 8. In particular implementations, a plurality of grooves 54 and plurality of removable sections 52 may be included to allow the electrical box 4 of the base unit 3 to be mounted within walls where the thickness of the outer material varies.

Figure 4:
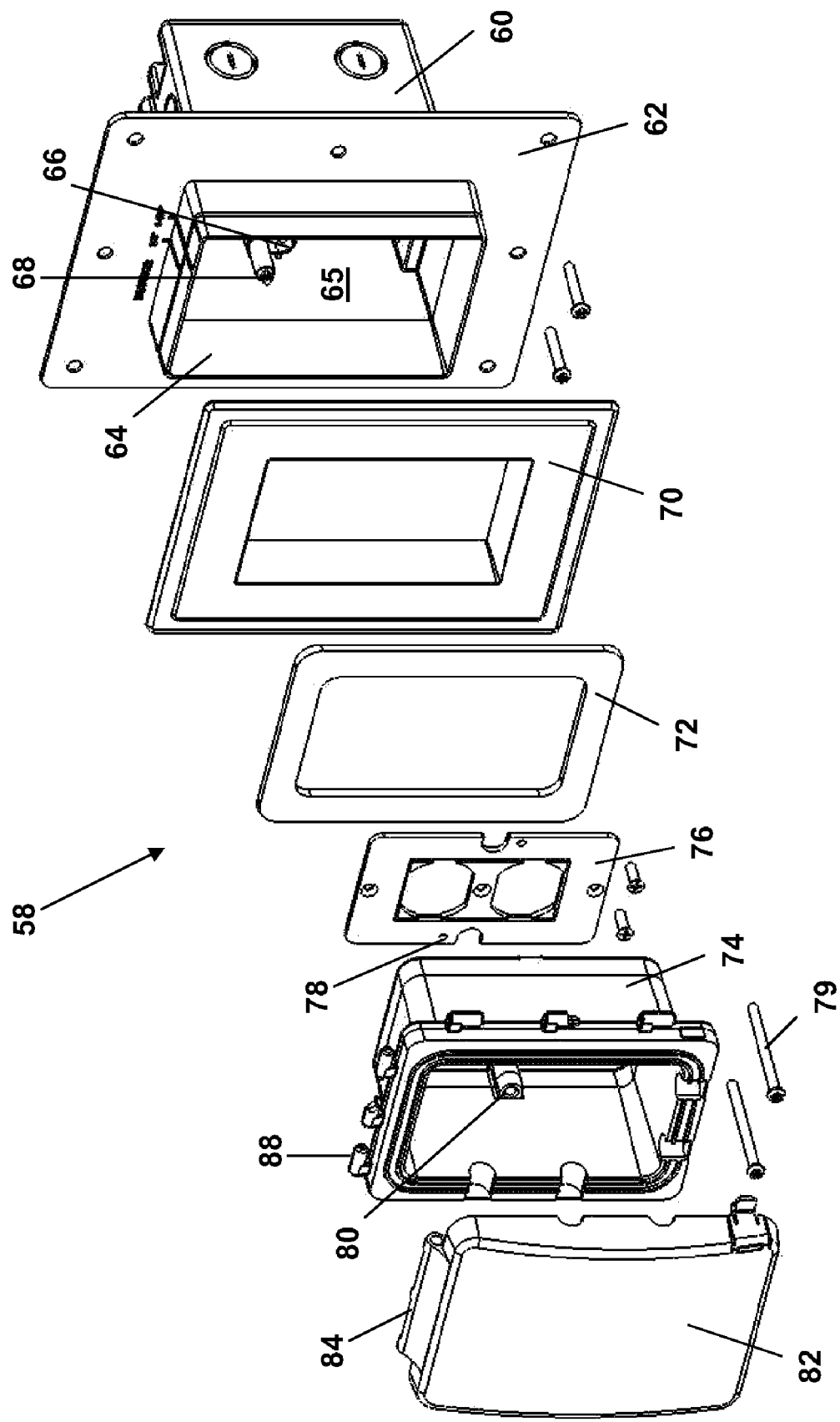
FIG. 4 is an exploded view of another particular implementation of an electrical device cover.

Referring to FIG. 4, another particular implementation of an electrical device cover 58 is illustrated. As illustrated, the electrical device cover 58 may include an electrical box 60, a siding flange 62, a sleeve flange 64, and an electrical device opening 65. A box sleeve mounting feature 66 and a mounting pin 68 may be coupled to the electrical box 60 within the electrical device opening 65. The electrical device cover 58 may include a face plate 70 that couples over the sleeve flange 64 and the siding flange 62. In particular implementations, a gasket 72 may be placed over the face plate 70 between a sleeve 74 and the face plate 70 to render the electrical device cover 58 more weatherproof. A cover plate 76 may be slidably coupled into the electrical device opening 65 of the electrical box 60 and may couple to the electrical box 60 through the mounting pin 68 and at least one mounting pin aperture 78 in the cover plate 76. The sleeve 74 may be coupled to the electrical box 60 through a mounting screw 79 inserted into a sleeve mounting feature 80 and the corresponding box sleeve mounting feature 66. A lid 82 may be hingedly coupled to the sleeve 74 through at least one lid hinge member 84 and at least one sleeve hinge member 88.

Figure 5:
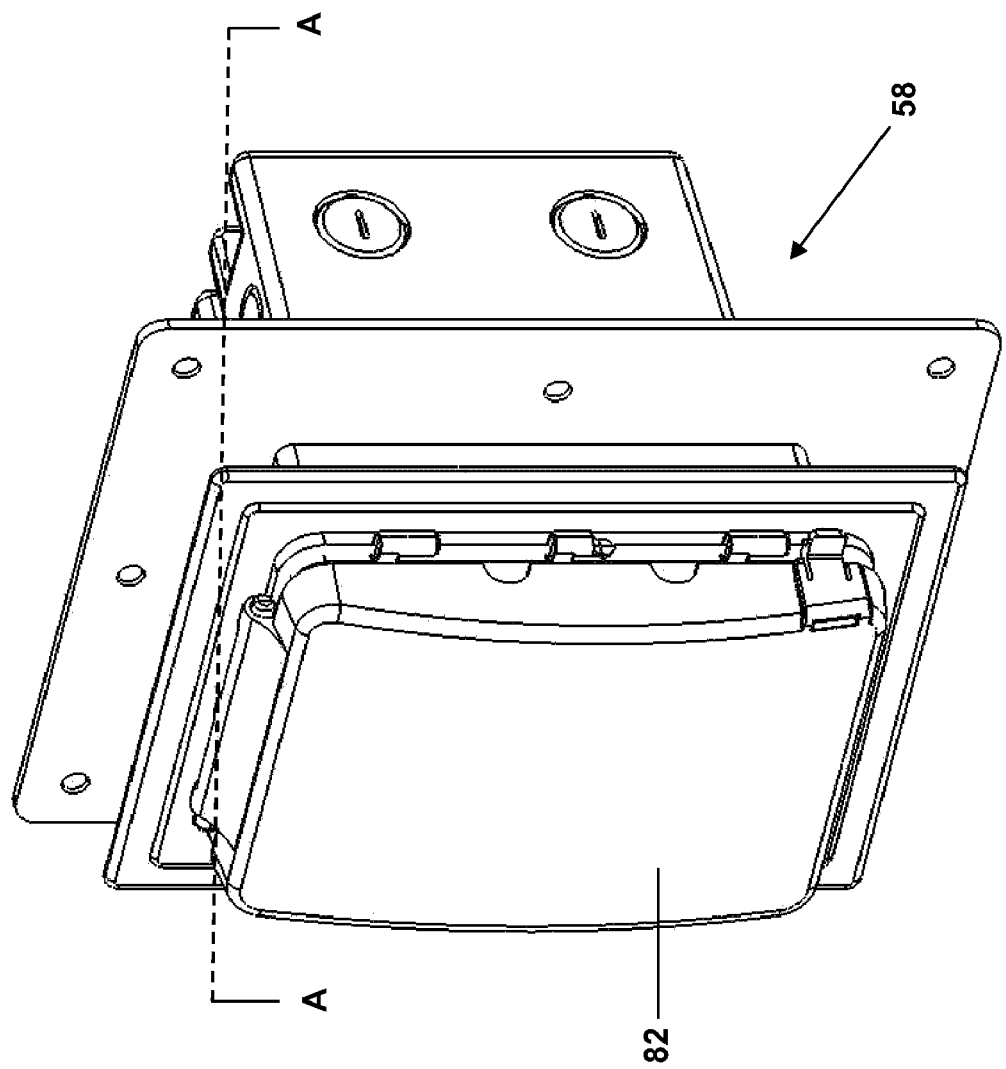
FIG. 5 is a view of the electrical device cover illustrated in FIG. 4 when assembled.
Figure 6:
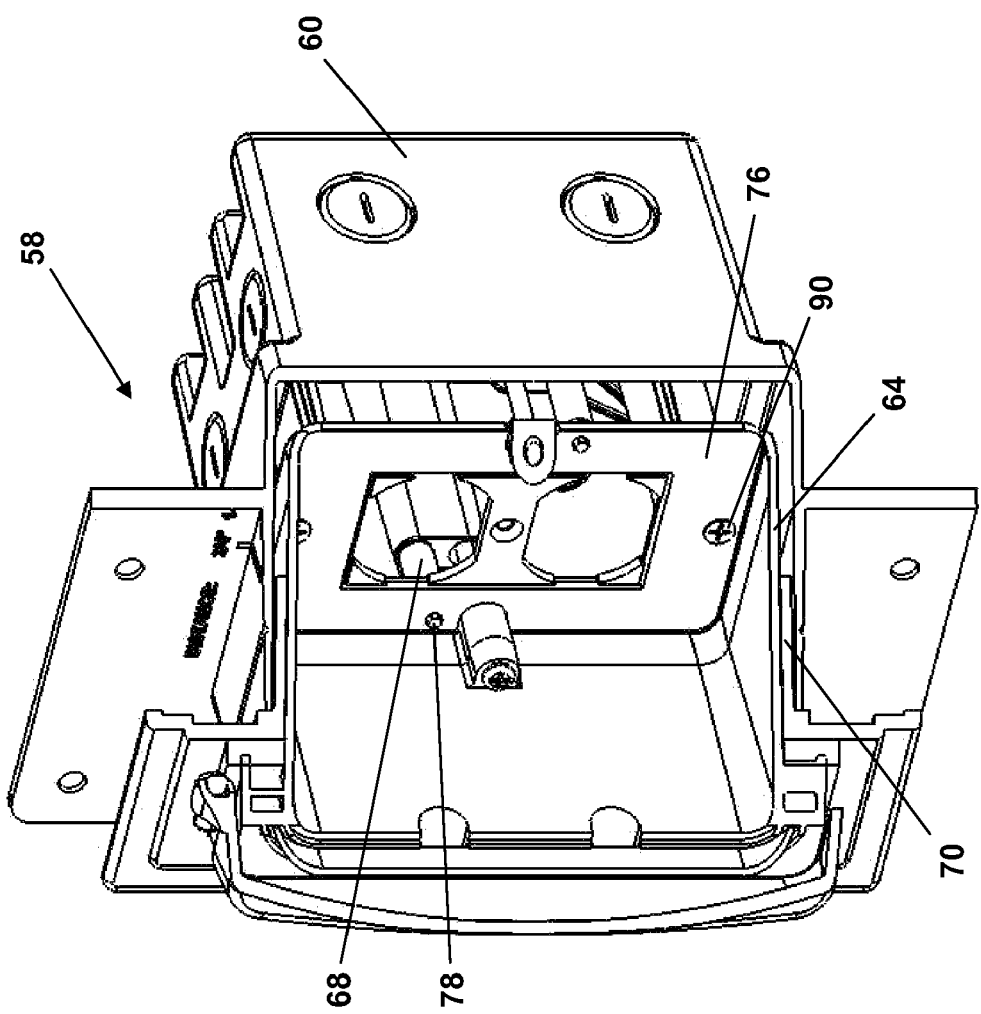
FIG. 6 is a cross sectional view of the electrical device cover assembly illustrated in FIG. 5 taken along sectional line A in FIG. 5.

Referring to FIG. 5, the electrical device cover 58 illustrated in FIG. 4 is shown in an assembled position with the lid 82 closed. Referring to FIG. 6, a cross-sectional view of the assembled electrical device cover 58 is shown along the sectional line A in FIG. 5. This cross-sectional view illustrates that the cover plate 76 may be coupled to the electrical box 60 through the mounting pin 68 and the mounting pin aperture 78. In addition, as illustrated in FIG. 6, the cover plate 76 may be coupled to the electrical box 60 through a cover plate mounting screw 90. In addition, as illustrated, in particular implementations, the face plate 70 may slidably couple into the sleeve flange 64 against its inner surface. In other implementations, the face plate 70 may slidably couple against the outer surface of the sleeve flange 64.

Implementations of electrical device covers and electrical device cover assemblies, and implementing components, may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, the electrical box, base unit, siding flange, face plate, sleeve, and sleeve flange may be formed of a plastic material like a polyvinyl chloride (PVC).

Some components defining electrical device cover or electrical device cover assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the lid and sleeve may be formed separately by an injection molding process, then coupled together through a separate assembly step.

Use.

Referring to FIGS. 1 and 4 as a particular example of an electrical device cover assembly or an electrical device cover, an electrical device cover assembly 2 or an electrical device cover 58 may be assembled through mounting the electrical box 4 within a wall or other surface. Mounting the electrical box 4 within the wall or surface allows the electrical device 14 to be mounted recessed with respect to the outer surface of the wall. Once an electrical device 14 has been coupled within the electrical box 4, in some particular implementations of an electrical device cover assembly 2, the cover plate 10 may be slidably coupled into the electrical device opening 12 of the electrical box 4 over the electrical device 14, followed by slidably coupling a sleeve 22 into the electrical device opening 12. In other particular implementations of an electrical device cover assembly 2, the sleeve 22 may be slidably coupled into the electrical device opening 12 prior to the cover plate 10. In some implementations of an electrical device cover assembly 2, either the sleeve 22 or the cover plate 10 may be first slidably coupled into the electrical device opening 12. The sleeve 22 may then be coupled to the electrical box 4 through a sleeve mounting feature 24. A lid 32 may then be hingedly coupled to the sleeve 22 through at least one lid hinge member 34 and at least one sleeve hinge member 30.

In particular implementations of an electrical device cover assembly 2, a sleeve flange 8 may be slidably coupled at the electrical device opening 12 of the electrical box 4. In implementations of a sleeve flange 8 containing at least one removable section 52, the distance the sleeve flange 8 projects perpendicularly to a plane formed by the electrical device opening 12 of the electrical box 4 may be adjusted by removing at least one removable section 52. In some implementations, a siding flange 6 may be slidably coupled at the electrical device opening 12 of the electrical box 4 and extend in a direction substantially parallel to a plane formed by the electrical device opening 12 of the electrical box 4.

Finally, in particular implementations of an electrical device cover assembly 2, the cover plate 10 may be coupled with the electrical box 4 through a mounting opening 76 in the cover plate 10 as the cover plate 10 is slidably coupled into the electrical device opening 12 of the electrical box 4.

It will be understood that implementations are not limited to the specific components disclosed herein, as virtually any components consistent with the intended operation of a method and/or system implementation for an electrical device cover may be utilized. Accordingly, for example, although particular base units, lids, and cover plates may be disclosed, such components may comprise any shape, size, style, type, model, version, class, grade, measurement, concentration, material, weight, quantity, and/or the like consistent with the intended operation of a method and/or system implementation for an electrical device cover may be used.

In places where the description above refers to particular implementations of an electrical device cover or an electrical device cover assembly, it should be readily apparent that a number of modifications may be made without departing from the spirit thereof and that these implementations may be applied to other electrical device cover assemblies or electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. An electrical device cover assembly comprising:
   a base unit comprising:
      an electrical box, the electrical box comprising a box sleeve mounting feature and an electrical device opening on a front side of the electrical box;
      an electrical device coupled into the electrical box;
      a cover plate slidably coupled into the electrical device opening of the electrical box over the electrical device, the cover plate comprising a sleeve mounting opening therethrough;

a sleeve slidably coupled into the electrical device opening, the sleeve slidable with respect to the cover plate, the sleeve comprising at least one sleeve hinge member, and a sleeve mounting feature aligned with the sleeve mounting opening and the box sleeve mounting feature; and a lid comprising at least one lid hinge member, the at least one lid hinge member coupled to the at least one sleeve hinge member.

2. The electrical device cover assembly of claim 1, wherein the base unit further comprises a siding flange coupled at the electrical device opening of the electrical box, the siding flange extending substantially parallel to a plane formed by the electrical device opening of the electrical box.

3. The electrical device cover assembly of claim 1, wherein the base unit further comprises a sleeve flange coupled at the electrical device opening of the electrical box and the electrical device opening of the base unit further comprises a perimeter, wherein the sleeve flange extends substantially perpendicular to a plane formed by the electrical device opening of the electrical box and along a majority of the perimeter of the electrical device opening.

4. The electrical device cover assembly of claim 1, wherein the base unit further comprises a face plate slidably coupled into the electrical device opening of the base unit.

5. An electrical device cover comprising:
a cover plate configured to mount within an electrical device opening of an electrical box such that a sleeve mounting opening of the cover plate aligns with a box sleeve mounting feature of the electrical box;

a sleeve configured to slidably couple into the electrical device opening of the electrical box, the sleeve slidable with respect to the cover plate, the sleeve comprising a sleeve mounting feature configured to align with both the sleeve mounting opening of the cover plate and the box sleeve mounting feature of the electrical box, and at least one sleeve hinge member; and a lid comprising at least one lid hinge member, the at least one lid hinge member coupled to the sleeve hinge member.

6. The electrical device cover of claim 5, further comprising a siding flange configured to couple at the electrical device opening of the electrical box, the siding flange configured to extend substantially parallel to a plane formed by the electrical device opening of the electrical box.

7. The electrical device cover of claim 5, further comprising a sleeve flange configured to couple at the electrical device opening of the electrical box, the sleeve flange configured to extend substantially perpendicular to a plane formed by the electrical device opening of the electrical box, the sleeve flange configured to extend along a majority of the perimeter of the electrical device opening.

8. The electrical device cover assembly of claim 7, wherein the sleeve flange is formed integrally with the base unit.

9. The electrical device cover of claim 7, wherein the sleeve flange further comprises at least one removable section.

10. The electrical device cover of claim 5, wherein the sleeve mounting opening is on a side of the cover plate.

11. The electrical device cover of claim 5, wherein the cover plate further comprises at least one mounting pin aperture.

12. The electrical device cover of claim 5, wherein the cover plate further comprises an electrical device aperture therethrough and a box mounting screw aperture therethrough and wherein the box mounting screw apertures are keyhole slot apertures.

13. The electrical device cover of claim 5, wherein the cover comprises at least a second cover plate.

14. The electrical device cover of claim 5, wherein the cover plate is configured to accommodate a first electrical device type and the cover plate further comprises at least one removable tab, wherein removal of the at least one removable tab converts an electrical device aperture in the cover plate to accommodate at least a second electrical device type different from the first electrical device type.

15. The electrical device cover of claim 5, wherein the cover plate is configured to accommodate a first electrical device type and the cover plate further comprises at least one adapter plate, wherein the adapter plate converts an electrical device aperture in the cover plate to accommodate at least a second electrical device type different from the first electrical device type.

16. The electrical device cover assembly of claim 15, wherein the adapter plate further comprises at least one removable tab, wherein removal of the at least one removable tab converts the electrical device aperture in the cover plate to accommodate at least a third electrical device type different from the first electrical device type.

17. The electrical device cover assembly of claim 5, wherein a cord port is comprised in at least one of a surface of the lid and the sleeve.

18. The electrical device cover assembly of claim 5, wherein the cover further comprises a face plate slidably coupled into the electrical device opening of the electrical box.

19. The electrical device cover assembly of claim 5, wherein the sleeve further comprises a plurality of sleeve hinge members on adjacent sides of the sleeve and the lid comprises lid hinge members on adjacent sides of the lid.

20. A method of installing an electrical device cover, the method comprising:
mounting an electrical box to a wall, the electrical box comprising a box sleeve mounting feature;
coupling an electrical device into the electrical box;
slidably coupling a cover plate into the electrical device opening of the electrical box over the electrical device such that a sleeve mounting opening of the cover plate aligns with the box sleeve mounting feature of the electrical box;
sliding a sleeve comprising a sleeve mounting feature and at least one sleeve hinge member into the electrical box;
coupling the sleeve to the electrical box through the sleeve mounting feature such that the sleeve mounting feature aligns with the sleeve mounting opening of the cover plate and the box sleeve mounting feature of the electrical box; and
hingedly coupling a lid comprising at least one lid hinge member to the at least one sleeve hinge member through the at least one lid hinge member.

21. The method of installing an electrical device cover of claim 20, further comprising coupling a sleeve flange at the electrical device opening of the electrical box.

22. The method of installing an electrical device cover of claim 21, wherein the sleeve flange further comprises at least one removable section, and the method further comprises the step of removing the at least one removable section of the sleeve flange.

23. The method of installing an electrical device cover of claim 20, wherein the step of coupling the cover plate into the electrical device opening of the electrical box over the electrical box is prior to the step of sliding the sleeve into the electrical box.

24. The method of installing an electrical device cover of claim 20, wherein the step of sliding the sleeve comprising the sleeve mounting feature and the at least one sleeve hinge member into the electrical box is prior to the step of slidably coupling the cover plate into the electrical device opening of the electrical box.

25. The method of installing an electrical device cover of claim 20, the method further comprising the step of coupling a mounting pin coupled with the electrical box at a mounting opening in the cover plate.

* * * * *